(12) United States Patent
Liu et al.

(10) Patent No.: US 11,645,179 B2
(45) Date of Patent: May 9, 2023

(54) METHOD AND APPARATUS OF MONITORING INTERFACE PERFORMANCE OF DISTRIBUTED APPLICATION, DEVICE AND STORAGE MEDIUM

(71) Applicant: Beijing Baidu Netcom Science Technology Co., Ltd., Beijing (CN)

(72) Inventors: Tao Liu, Beijing (CN); Jiajie Jing, Beijing (CN); Qiyuan Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 103 days.

(21) Appl. No.: 17/352,466

(22) Filed: Jun. 21, 2021

(65) Prior Publication Data

US 2021/0311845 A1 Oct. 7, 2021

(30) Foreign Application Priority Data

Dec. 24, 2020 (CN) .......................... 202011555255.6

(51) Int. Cl.
*G06F 11/30* (2006.01)
*G06F 11/32* (2006.01)
*G06F 11/34* (2006.01)

(52) U.S. Cl.
CPC ...... *G06F 11/3006* (2013.01); *G06F 11/3075* (2013.01); *G06F 11/328* (2013.01); *G06F 11/3409* (2013.01)

(58) Field of Classification Search
CPC ............... G06F 11/3006; G06F 11/302; G06F 11/3075; G06F 11/3083; G06F 11/3093; G06F 11/328; G06F 11/3404; G06F 11/3409; G06F 11/3419; G06F 11/3452; G06F 11/3495; G06F 2201/875

(Continued)

(56) References Cited

U.S. PATENT DOCUMENTS 10,082,983 B2 * 9/2018 Iyengar ................ G06F 3/0611
10,305,758 B1 5/2019 Bhide et al.

(Continued)

FOREIGN PATENT DOCUMENTS

CN 111352817 A 6/2020

OTHER PUBLICATIONS

Official Communication issued in corresponding European Patent Application No. 21180641.9, dated Dec. 13, 2021.

*Primary Examiner* — John H Le
(74) *Attorney, Agent, or Firm* — Keating & Bennett, LLP

(57) ABSTRACT

The present disclosure discloses a method and apparatus of monitoring an interface performance of a distributed application, a device and a storage medium, which relates to a field of computer technology, in particular to a field of cloud platform. The method includes: in case of detecting a caller request for calling an interface of the distributed application, obtaining a performance data of the interface for responding the caller request; updating a performance data distribution characteristic of the interface according to the performance data of the interface for responding the caller request, so as to obtain an updated performance data distribution characteristic; and monitoring the interface performance of the distributed application, according to the updated performance data distribution characteristic of the interface.

7 Claims, 10 Drawing Sheets

Figure 1:
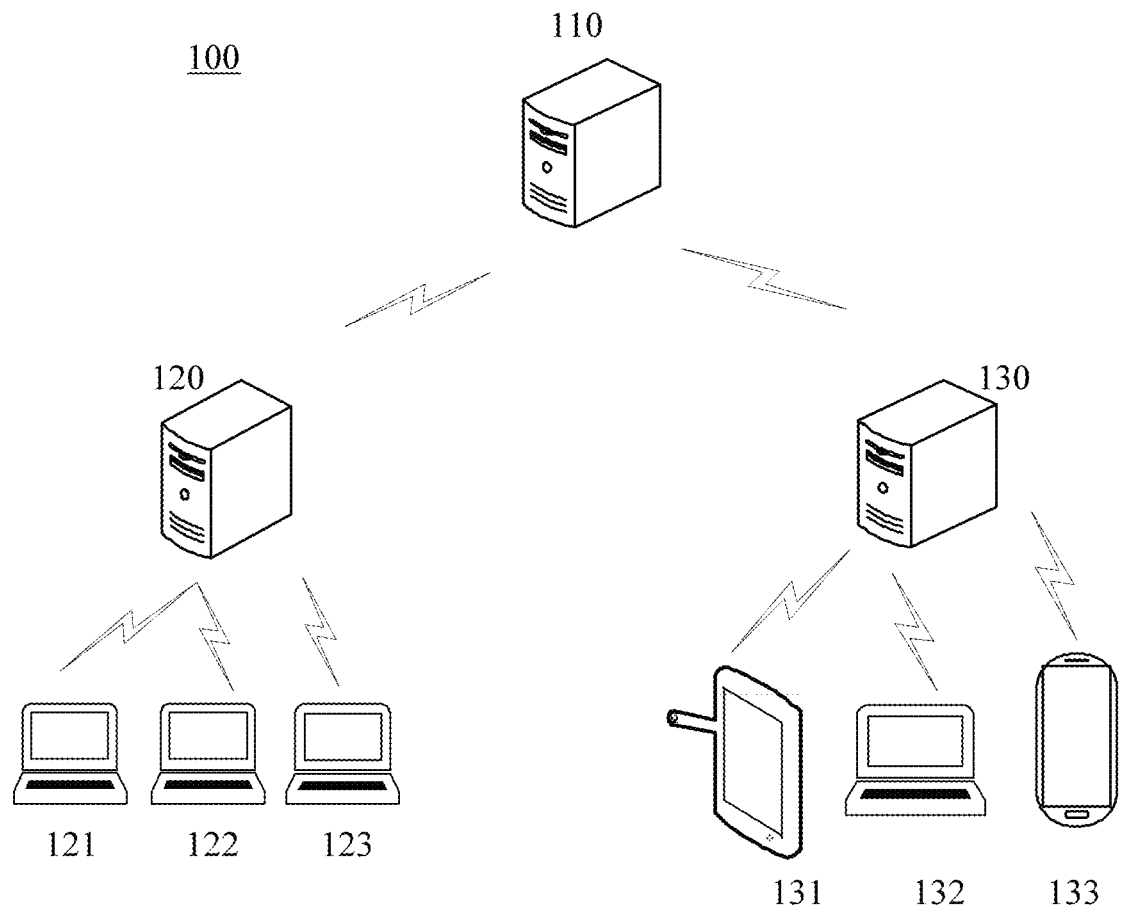

(58) Field of Classification Search
USPC .......................................................... 702/186
See application file for complete search history.

(56) References Cited

U.S. PATENT DOCUMENTS

| | | | |
|---|---|---|---|
| 10,423,356 B2 * | 9/2019 | Iyengar | G06F 11/34 |
| 10,817,358 B2 | 10/2020 | Ertl et al. | |
| 11,163,481 B2 * | 11/2021 | Iyengar | G06F 3/0683 |

* cited by examiner

METHOD AND APPARATUS OF MONITORING INTERFACE PERFORMANCE OF DISTRIBUTED APPLICATION, DEVICE AND STORAGE MEDIUM

CROSS-REFERENCE TO RELATED APPLICATION(S)

This application claims priority to the Chinese Patent Application No. 202011555255.6, filed on Dec. 24, 2020, which is incorporated herein by reference in its entirety.

TECHNICAL FIELD

The present disclosure relates to a field of computer technology, in particular to a field of cloud platform and other technologies.

BACKGROUND

With a continuous development of computer technology, interfaces have become bridges for communications between various services. It is important to monitor an interface performance, so that a business system may provide stable services.

In a related art, JMeter, LoadRunner and other stress testing tools are used to monitor the interface performance. In a stress testing process, interface response times are recorded, and an average value of the interface response times is used as a reference. Alternatively, Prometheus and other monitoring tools may be used to monitor the interface performance.

However, the stress testing tools are generally limited to a stress testing phase, failing to continuously monitor an online system. Prometheus and other monitoring tools may only monitor interface response times for a single instance. The tools are more suitable for a monolithic architecture, an active-standby architecture and other simple system architectures, but it is difficult to apply the tools to a distributed application cluster.

SUMMARY

According to the present disclosure, there is provided a method and apparatus of monitoring an interface performance of a distributed application, a device and a storage medium.

According to an aspect of the present disclosure, there is provided a method of monitoring an interface performance of a distributed application, including: in case of detecting a caller request for calling an interface of the distributed application, obtaining a performance data of the interface for responding the caller request; updating a performance data distribution characteristic of the interface according to the performance data of the interface for responding the caller request, so as to obtain an updated performance data distribution characteristic; and monitoring the interface performance of the distributed application, according to the updated performance data distribution characteristic of the interface.

According to another aspect of the present disclosure, there is provided an apparatus of monitoring an interface performance of a distributed application, including an obtaining module, an updating module and a monitoring module.

The obtaining module is configured to, in case of detecting a caller request for calling an interface of the distributed application, obtain a performance data of the interface for responding the caller request.

The updating module is configured to update a performance data distribution characteristic of the interface according to the performance data of the interface for responding the caller request, so as to obtain an updated performance data distribution characteristic.

The monitoring module is configured to monitor the interface performance of the distributed application, according to the updated performance data distribution characteristic of the interface.

According to another aspect of the present disclosure, there is provided an electronic device, including: at least one processor; and a memory communicatively connected to the at least one processor, wherein the memory stores instructions executable by the at least one processor, and the instructions, when executed by the at least one processor, cause the at least one processor to implement the method as described above.

According to another aspect of the present disclosure, there is provided a non-transitory computer-readable storage medium having computer instructions stored thereon, wherein the computer instructions allow a computer to implement the method as described above.

According to another aspect of the present disclosure, there is provided a computer program product including computer programs, and the computer programs, when executed by a processor, implement the method as described above.

It should be understood that the content described in this part is not intended to identify critical features or important features of the embodiments of the present disclosure, and it is not intended to limit the scope of the present disclosure. Other features of the present disclosure will become easily understood by the following description.

BRIEF DESCRIPTION OF THE ACCOMPANYING DRAWINGS

Figure 2:
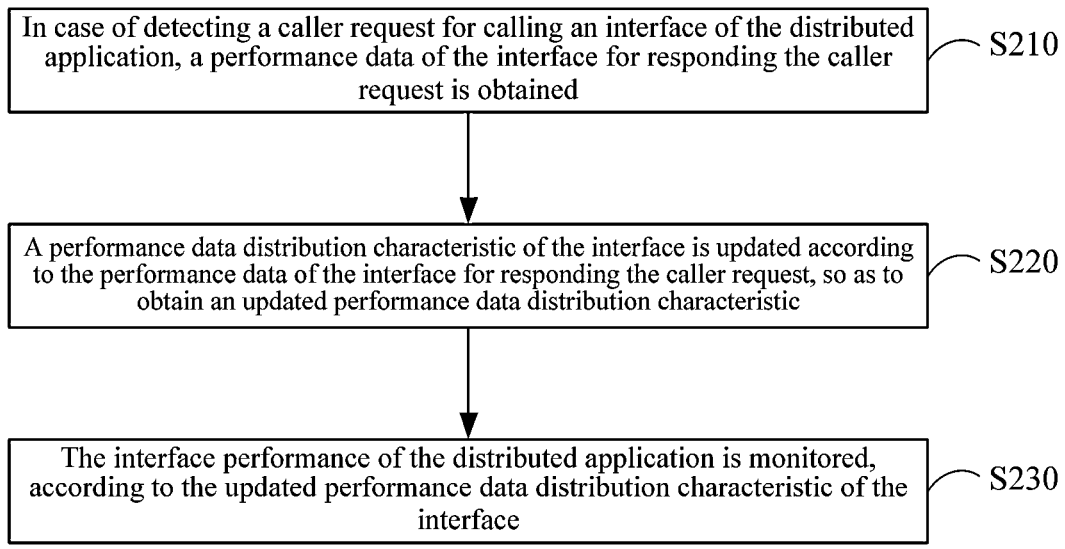
Figure 3:
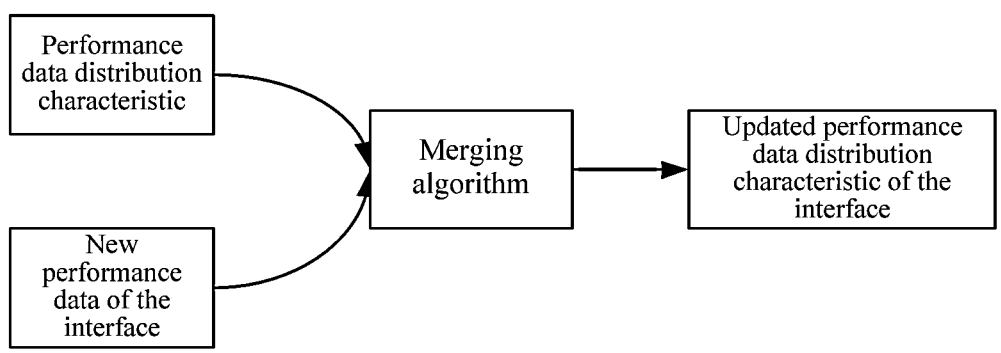
Figure 4:
Figure 5:
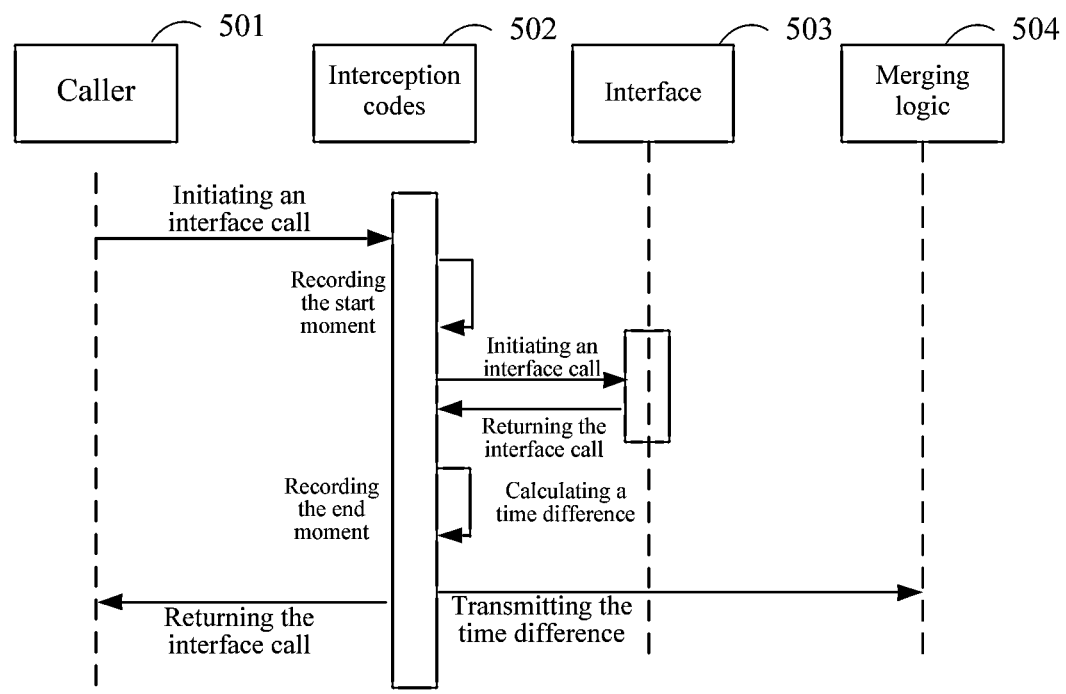
Figure 6:
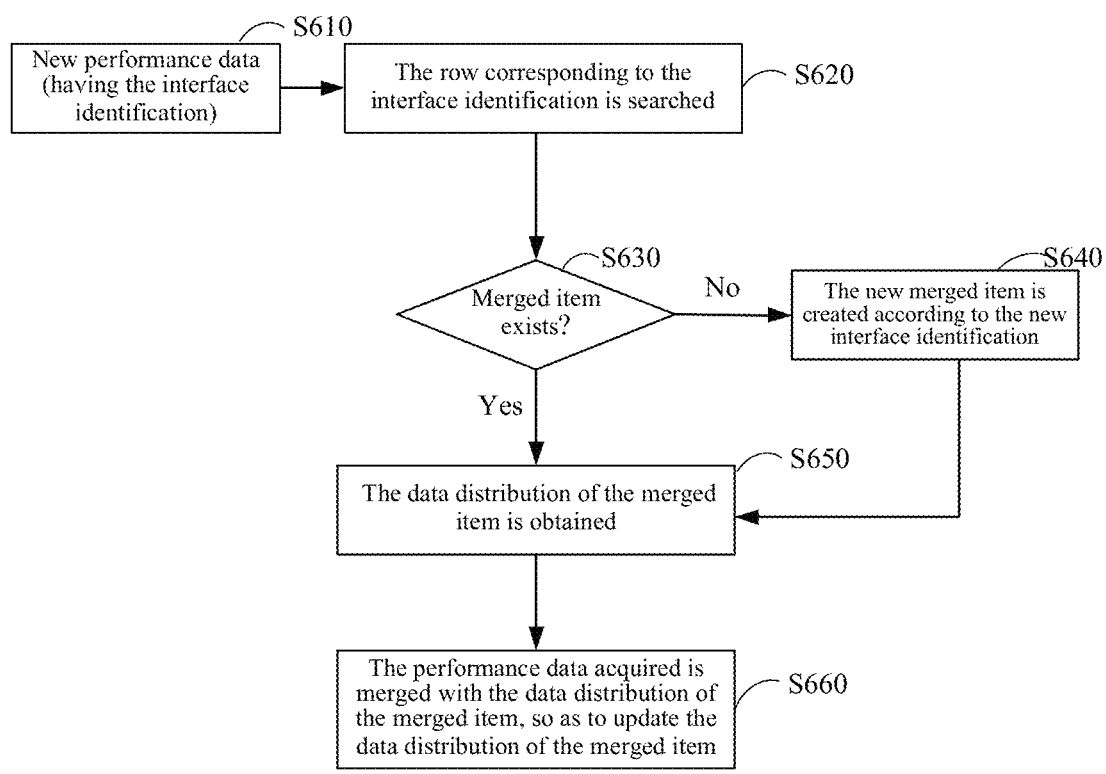
Figure 7:
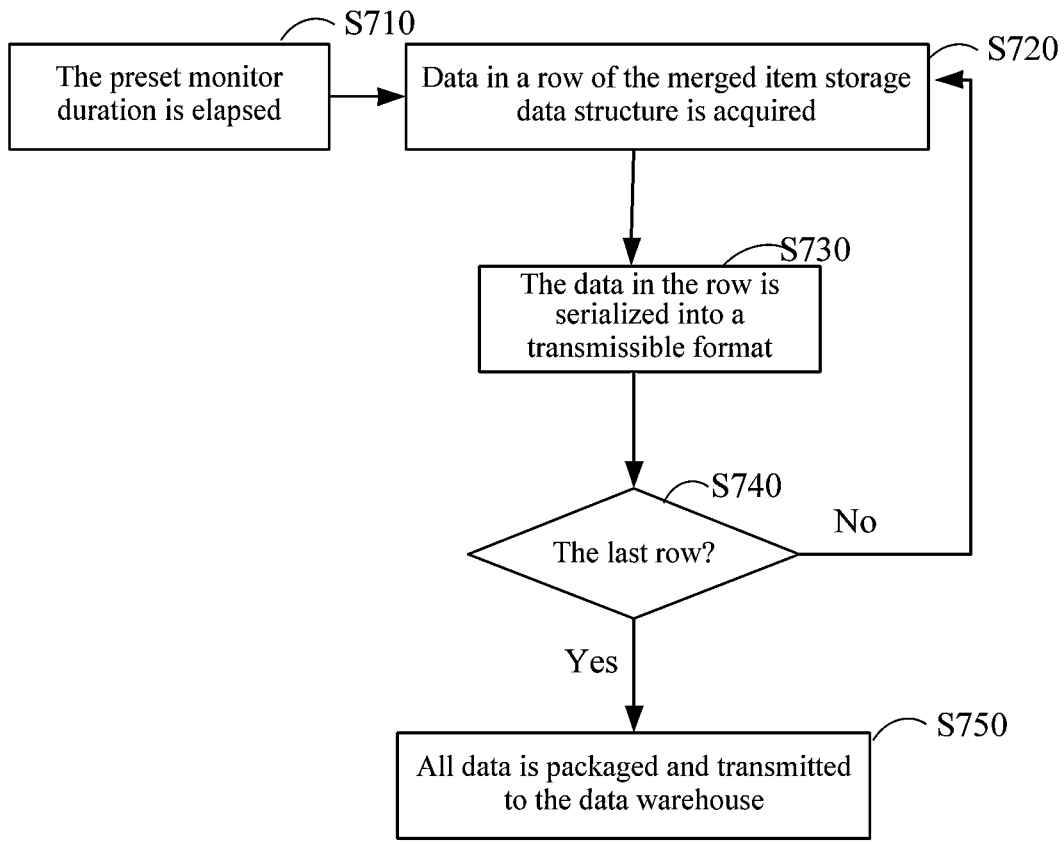
Figure 8:
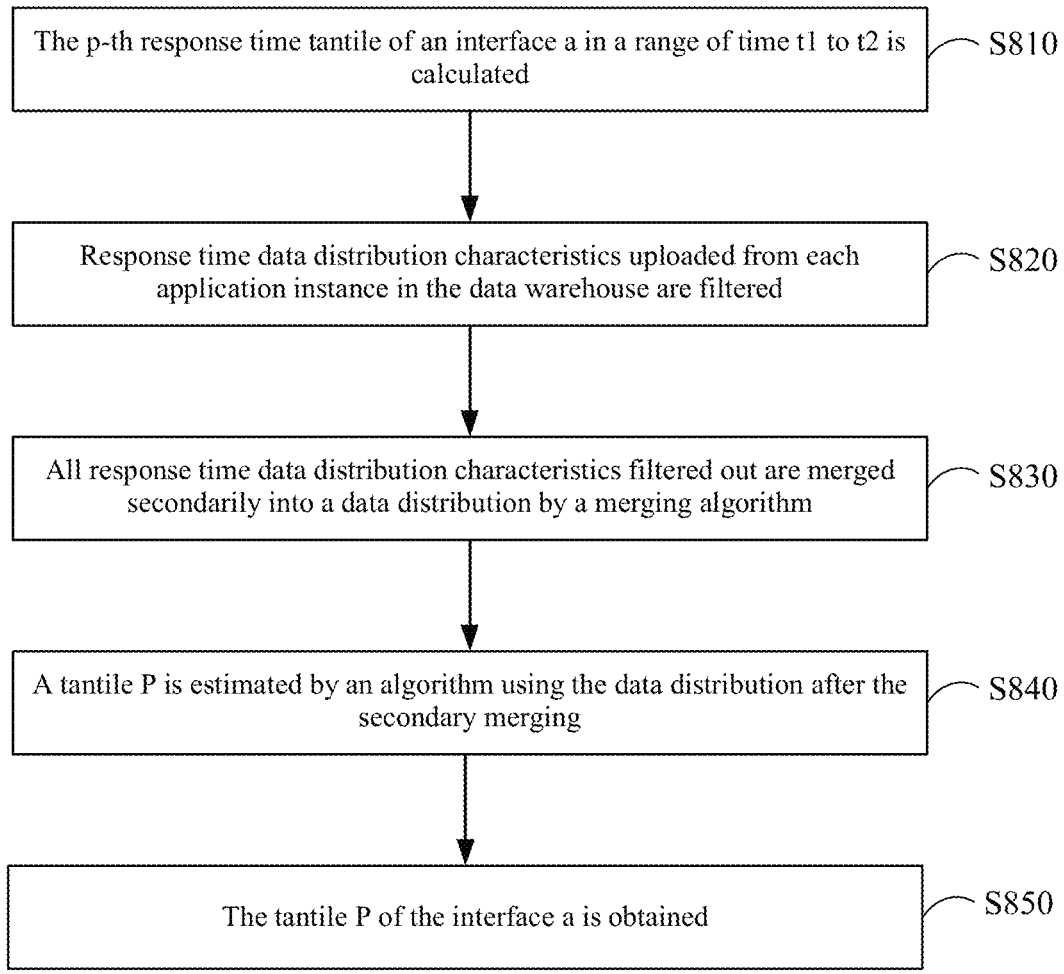
Figure 9:
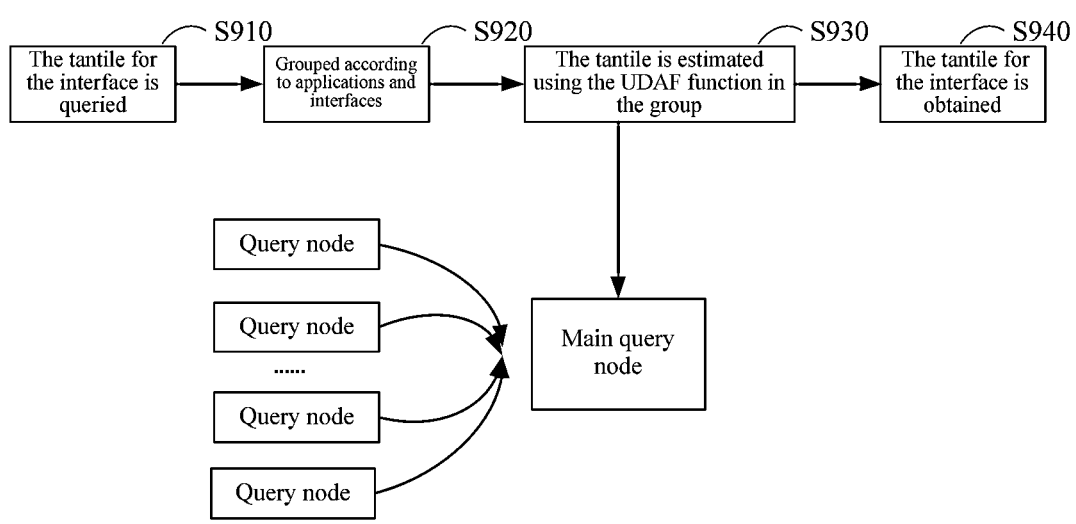
Figure 10:
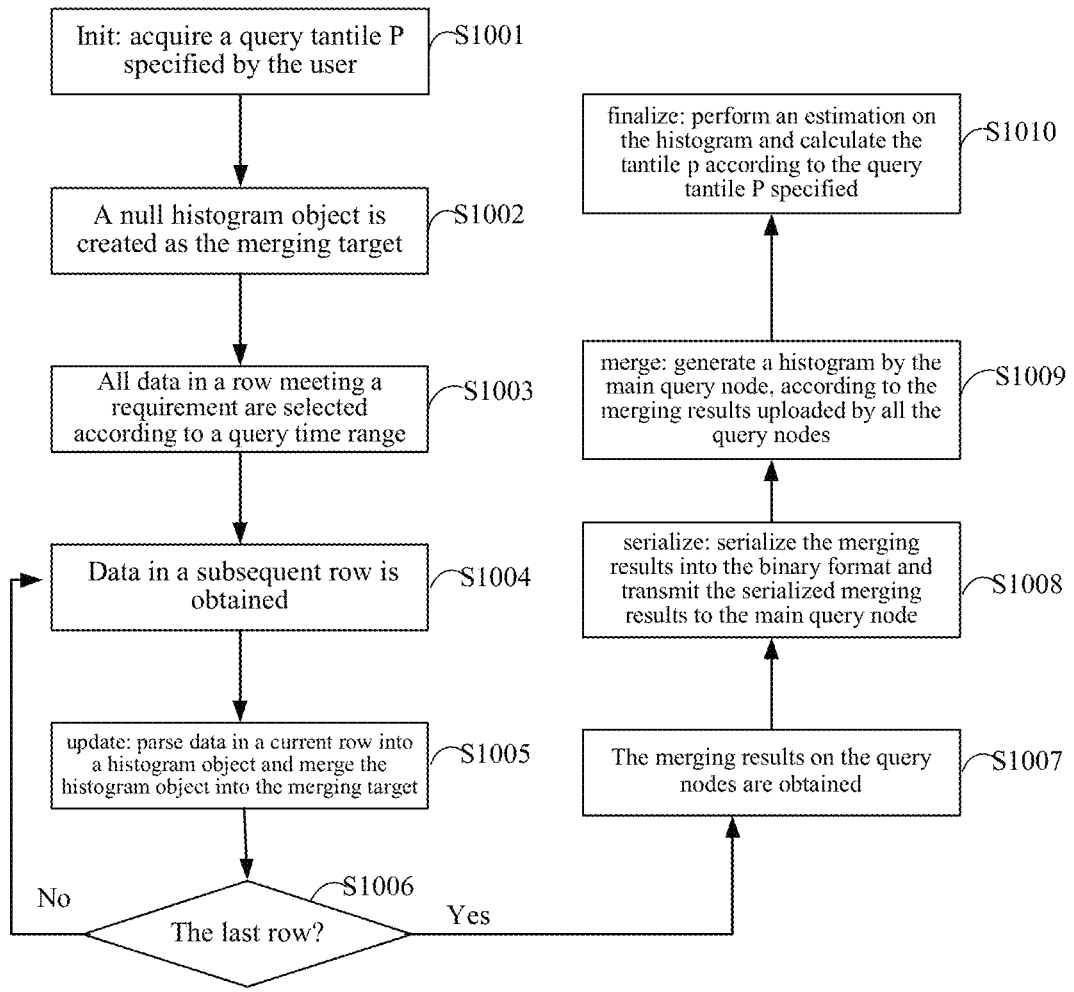
Figure 11:
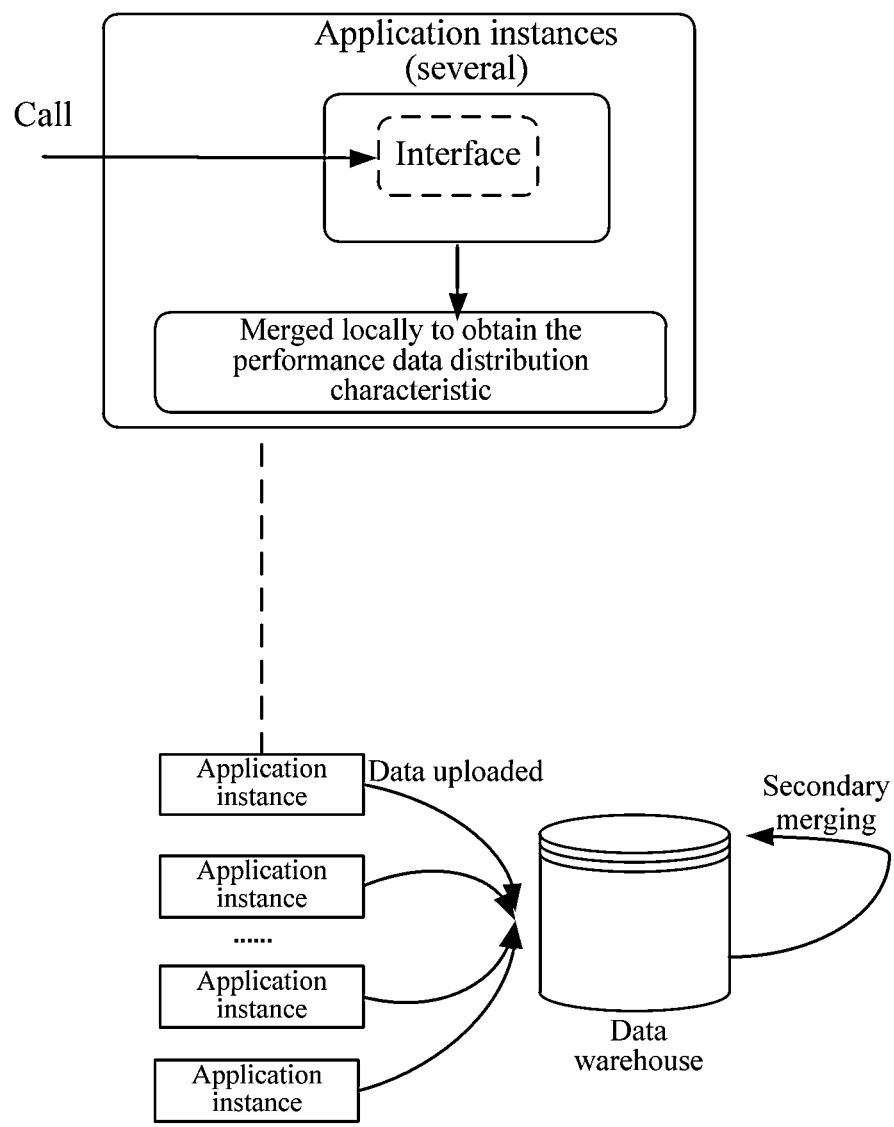
Figure 12:
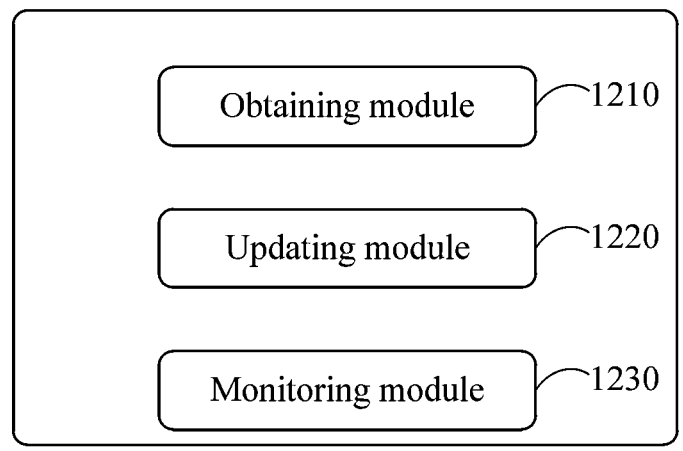
Figure 13:
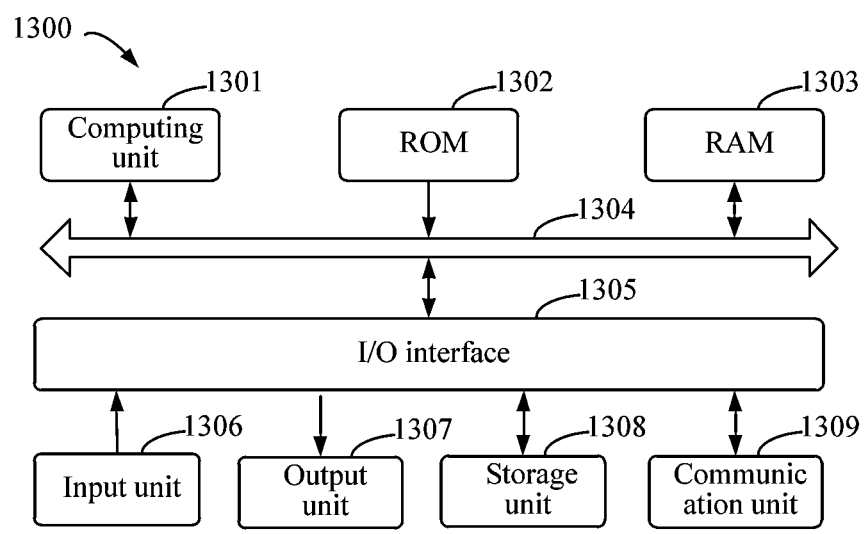

The accompanying drawings are used to better understand the solution and do not constitute a limitation to the present disclosure, in which:

FIG. 1 schematically shows an exemplary system architecture that may apply a method and apparatus of monitoring an interface performance of a distributed application according to the embodiments of the present disclosure;

FIG. 2 schematically shows a flowchart of a method of monitoring an interface performance of a distributed application according to the embodiments of the present disclosure;

FIG. 3 schematically shows a diagram of obtaining a performance data of an interface for responding a caller request according to the embodiments of the present disclosure;

FIG. 4 schematically shows a diagram of a logical data structure of a histogram according to the embodiments of the present disclosure;

FIG. 5 schematically shows a diagram of obtaining the performance data of the interface for responding the caller request according to the embodiments of the present disclosure;

FIG. 6 schematically shows a flowchart of updating a performance data distribution characteristic in a merged item storage data structure according to the embodiments of the present disclosure;

FIG. 7 schematically shows a flowchart of transmitting the merged item storage data structure to a data warehouse according to the embodiments of the present disclosure;

FIG. 8 schematically shows a flowchart of merging response time data distribution characteristics for the same interface transmitted by each distributed application and determining a tantile according to the embodiments of the present disclosure;

FIG. 9 schematically shows a flowchart of querying the tantile based on the data warehouse according to the embodiments of the present disclosure;

FIG. 10 schematically shows a flowchart of querying the tantile by using a UDAF function according to the embodiments of the present disclosure;

FIG. 11 schematically shows a flowchart of a method of monitoring an interface performance of a distributed application according to the embodiments of the present disclosure;

FIG. 12 schematically shows a block diagram of an apparatus of monitoring an interface performance of a distributed application according to the embodiments of the present disclosure; and FIG. 13 schematically shows a block diagram of an exemplary electronic device that may be used to implement the embodiments of the present disclosure.

DETAILED DESCRIPTION

The exemplary embodiments of the present disclosure are described below with reference to the drawings, which include various details of the embodiments of the present disclosure to facilitate understanding, and which should be considered as merely illustrative. Therefore, those ordinary skilled in the art should realize that various changes and modifications may be made to the embodiments described herein without departing from the scope and spirit of the present disclosure. In addition, for clarity and conciseness, descriptions of well-known functions and structures are omitted in the following description.

A distributed architecture is a mainstream architecture for an information system. The distributed architecture is widely used in various technology systems such as mobile Internet, cloud computing, big data, Internet of Things, etc. The distributed architecture is a basic technology in the information age. In the distributed architecture, an interface is a basic unit for application service. An information system based on the distributed system may have tens of thousands to hundreds of millions of interface calls every day, producing TB level monitoring data, and leading to a challenge in designing a monitoring system.

In a process of realizing the present disclosure, it is found that there is no good monitoring scheme for monitoring an interface performance of a distributed application. Furthermore, monitoring a tantile of interface response times is a difficulty in analyzing the interface performance.

According to the embodiments of the present disclosure, there is provided a method and apparatus of monitoring an interface performance of a distributed application, an electronic device and a storage medium.

The method of monitoring an interface performance of a distributed application includes following operations. In case of detecting a caller request for calling an interface of the distributed application, a performance data of the interface for responding the caller request is obtained. A performance data distribution characteristic of the interface is updated according to the performance data of the interface for responding the caller request, so as to obtain an updated performance data distribution characteristic. The interface performance of the distributed application is monitored, according to the updated performance data distribution characteristic of the interface.

FIG. 1 schematically shows an exemplary system architecture that may apply a method and apparatus of monitoring an interface performance of a distributed application according to the embodiments of the present disclosure.

It should be noted that FIG. 1 is only an example of a system architecture that may apply the embodiments of the present disclosure to help those skilled in the art understand the technical content of the disclosure, but it does not mean that the embodiments of the present disclosure may not be used for other devices, systems, environments or scenarios.

As shown in FIG. 1, the system architecture 100 according to the embodiments may include distributed servers 110, 120, 130, terminal devices 121, 122, 123, and terminal devices 131, 132, 133. The server 110 may be communicatively connected to the server 120 and the server 130. The terminal devices 121, 122, 123 may be communicatively connected to the server 120. The terminal devices 131, 132, 133 may be communicatively connected to the server 130.

According to the embodiments of the present disclosure, the communicative connections above may include various connection types, such as wired communication links and/or wireless communication links, etc.

The terminal devices 121, 122, 123, and the terminal devices 131, 132, 133 may have various communication client applications installed, such as knowledge reading applications, web browser applications, search applications, instant messaging tools, mailbox clients and/or social platform software (examples only).

The terminal devices 121, 122, 123 and the terminal devices 131, 132, 133 may be various electronic devices having display screens and supporting web browsing, including but not limited to smartphones, tablets, laptop computers, desktop computers, etc.

The servers 110, 120, 130 may be servers providing various services, such as background management servers (example only) supporting content browsed by users using the terminal devices. The background management servers may analyze and process user requests and other data received, and feedback processing results (such as web pages, information, or data acquired or generated according to the user requests) to the terminal devices.

It should be understood that the numbers of the terminal devices, networks, and servers in FIG. 1 are only schematic. There may be any numbers of terminal devices, networks and servers as needed.

FIG. 2 schematically shows a flowchart of a method of monitoring an interface performance of a distributed application according to the embodiments of the present disclosure.

As shown in FIG. 2, the method includes operations S210 to S230.

In operation S210, in case of detecting a caller request for calling an interface of the distributed application, a performance data of the interface for responding the caller request is obtained.

In operation S220, a performance data distribution characteristic of the interface is updated according to the performance data of the interface for responding the caller request, so as to obtain an updated performance data distribution characteristic.

In operation S230, the interface performance of the distributed application is monitored, according to the updated performance data distribution characteristic of the interface.

According to the embodiments of the present disclosure, there is no limitation on a type of performance data. For example, the performance data includes but is not limited to a response interval data, a request data amount data, a concurrency data, a SQL execution number, a cache hit number, a downstream service call number, a log print number, etc.

According to the embodiments of the present disclosure, the performance data distribution characteristic is a summary for the performance data of the interface, and may be used to approximate a tantile, an average value, etc. The data distribution characteristic may be a data structure satisfying one or more of: describing a distribution structure of original data samples; capable of receiving a new data sample to adjust a data distribution (i.e. merging); meeting an associative law (i.e., a plurality of data distributions may be combined into a global data distribution); capable of estimating an approximate tantile of the original data samples by using the data distribution; having a constant memory space with a controllable accuracy.

According to the embodiments of the present disclosure, every time an interface call is intercepted, the performance data of the interface for the call is acquired, and then the performance data distribution characteristic of the interface is updated.

According to the embodiments of the present disclosure, it tends to integrate with other monitors. A distributed monitoring is implemented at an application level most. The embodiments of the disclosure implement an interface interception at an application layer. In this way, it tends to integrate with other performance monitoring tools, link monitoring tools, etc.

FIG. 3 schematically shows a diagram of obtaining the performance data of the interface for responding the caller request according to the embodiments of the present disclosure.

As shown in FIG. 3, after a new performance data of the interface is obtained, the new performance data is merged with a previous performance data distribution characteristic of the interface, and the updated performance data distribution characteristic of the interface is obtained using a merging algorithm.

According to the embodiments of the present disclosure, there are many specific implementations of the data distribution, including but not limited to a histogram, a T-Digest algorithm, a Q-Digest algorithm, a DK algorithm, etc., and there is no limitation on the specific implementation of the data distribution.

According to the embodiments of the present disclosure, when monitoring the interface performance of the distributed application according to the updated performance data distribution characteristic of the interface, a tantile for the interface may be determined according to the updated performance data distribution characteristic of the interface, and the interface performance of the distributed application may be monitored based on the tantile. An accuracy of the tantile depends on a selection of a data distribution algorithm. With an appropriate selection and design, the accuracy may achieve about 0.1% in practice.

According to the embodiments of the present disclosure, it is possible to monitor the interface performance of a large-scale distributed application, especially to monitor the tantile of the interface response times, and statistical information may be accurate to each interface. The embodiments of the present disclosure may solve a monitoring complexity caused by characteristics of the distributed system itself, and effectively monitor the interface performance of the distributed system. This is suitable for an online system, and is not limited to a testing phase.

FIG. 4 schematically shows a diagram of a logical data structure of the histogram according to the embodiments of the present disclosure.

As shown in FIG. 4, the histogram is taken as an example of the data distribution. The histogram contains several buckets, and each bucket contains a lower boundary and an upper boundary. The upper boundary of the bucket and the lower boundary of the bucket determine a number of the original data samples within this interval.

The interface response time is taken as an example of the sample data. The interface response time has strong bias (that is, most interface calls return in a short time, and few calls return in a long time). Therefore, if the bucket interval is closer to 0, then the interval is smaller, and the accuracy is higher; and if the response interval is higher, then the bucket is sparser, and the accuracy is lower. According to the embodiments of the present disclosure, the bucket may be increased by a step length of 3%.

```
0, 1, 2, 3, 4, 5, 6, 7, 8, 9, 10, 11, 12, 13, 14, 15, 16, 17, 18,
19, 20, 21, 22, 23, 24, 25, 26, 27, 28, 29, 30, 31, 32, 33, 34,
35, 36, 37, 38, 39, 40, 41, 42, 43, 44, 45, 46, 47, 48, 49, 50,
51, 52, 53, 54, 55, 56, 57, 58, 59, 60, 61, 62, 63, 64, 65, 66,
67,
69, 71, 73, 75, 77, 79, 81, 83, 85, 87, 89, 91, 93, 95, 97, 99,
101, 104, 107, 110, 113, 116, 119, 122, 125, 128, 131, 134, 138,
142, 146, 150, 154, 158, 162, 166, 170, 175, 180, 185, 190, 195,
200, 206, 212, 218, 224, 230, 236, 243, 250, 257, 264, . . . (increased
by a step length of 3%) 300000
```

According to the embodiments of the present disclosure, a data storage structure of the performance data distribution characteristic may be an array structure int [ ] stored in a memory. For example:

int histogram[N]; N=a number of the buckets.

Each item in the array represents a bucket, and a value of each item in the array represents a number of data samples contained in the bucket. For example:

histogram [83]=108 means that there are values of 108 data samples in an interval (99-101) of the 83rd bucket.

According to the embodiments of the present disclosure, histograms in all instances of a distributed application have the same structure, so that the histograms may be merged. Every time a new data sample (for example, an interface response time) is acquired, a bucket is found from the histogram to contain a value of the new data sample between the upper boundary of the bucket and the lower boundary of the bucket. Then a value of the bucket is increased by one. In this manner, the performance data distribution characteristic is updated.

According to the embodiments of the present disclosure, an algorithm for estimating a tantile P % using the histogram is as follows.

First, a sum of the value of each bucket in the histogram is calculated, that is, a total number of the data samples is calculated, by: total=sum (histogram [i]); i=0 . . . N.

Then, how many values of the data samples are smaller than the P %-th value of the data samples is calculated by: count=total*P %.

Next, the value of each bucket in the histogram is accumulated from a head of the histogram to a tail of the histogram and the sum is identified as s, until the sum satisfies s≥count after the k-th bucket is accumulated. Pseudo codes are shown as follows.

s=0, i=0
while(s<count)
s+=histogram[i]
i++
end
k=i

Thus, the tantile P % is a bucket interval corresponding to bucket histogram[k], and the lower boundary of bucket histogram[k] is regarded as the estimated tantile (if bucket histogram[k] is 535-551, then the tantile P % is 535).

According to the embodiments of the present disclosure, a histogram may be stored for each interface separately to record the performance data of the interface. A process of merging a local histogram may include following operations. The data samples are received. A corresponding interface information is found. An interface performance data histogram is updated. The local histogram is uploaded and cleared regularly.

According to the embodiments of the present disclosure, the response interval data is taken as an example of the performance data. Obtaining the performance data of the interface for responding the caller request in case of detecting the caller request for calling the interface of the distributed application includes following operations. In case of detecting the caller request for calling the interface of the distributed application, a start calling moment of the interface is recorded. An end calling moment of the interface is recorded. The performance data of the interface for responding the caller request is determined according to the start calling moment and the end calling moment.

According to the embodiments of the present disclosure, the start calling moment may be subtracted from the end calling moment to obtain the response interval data. The response interval data is used as the performance data of the interface for responding the caller request.

Referring to FIG. 5, the method shown in FIG. 2 may be further described in combination with specific embodiments.

FIG. 5 schematically shows a diagram of obtaining the performance data of the interface for responding the caller request according to the embodiments of the present disclosure.

As shown in FIG. 5, a caller 501 initiates an interface call, for calling an interface 503 of the distributed application.

According to the embodiments of the present disclosure, in an interface interception phase, interception codes 502 are used to intercept each interface of the application. A monitoring logic is implemented before the interface is executed and after the interface is executed, recording the start calling moment of the interface and the end calling moment of the interface, so as to calculate a response time difference of the interface. Then, the response time difference is transmitted to a merging logic 504, so that the merging logic 504 may merge and update according to the original data distribution characteristic and the response time difference obtained.

According to the embodiments of the present disclosure, specific technologies of the interception codes 502 may be realized by manual embedding, Java bytecode enhancement, etc.

According to the embodiments of the present disclosure, updating the performance data distribution characteristic of the interface according to the performance data of the interface for responding the caller request includes following operations. A performance data distribution characteristic corresponding to an interface identification of the interface is determined from a merged item storage data structure, according to the interface identification of the interface. The merged item storage data structure contains a plurality of interface identifications and a performance data distribution characteristic corresponding to each of the plurality of interface identifications. The performance data distribution characteristic of the interface is updated in the merged item storage data structure, according to the performance data of the interface for responding the caller request.

According to the embodiments of the present disclosure, monitored data of all instances in a cluster may be converged into the application level for observation, by using the merged item storage data structure. Thus, a discreteness of a bottom layer in the distributed system may be shielded, and interface performance indexes of the distributed application may be monitored visually and globally.

According to the embodiments of the present disclosure, there is no limitation on a form of the merged item storage data structure, as long as the data structure may satisfy a mapping relationship between the interface identification and the corresponding performance data distribution characteristic. The merged item storage data structure, may include but not limited to a table, a hash map, a binary search list, etc. Specifically, the merged item storage data structure may be a HashMap data structure in Java.

Each application instance (i.e. the distributed application) in the distributed system contains several interfaces. For each interface, the performance data distribution should be recorded respectively. According to the embodiments of the present disclosure, the table may be used to store the data distribution of each interface, as shown in Table 1.

TABLE 1

Application name: app1
Instance: instance1 (10.20.30.40)
Start merging moment: 2020-10-10 18:00:00
Merging period: 1 h

| Interface identification (only as an example) | Performance data distribution |
|---|---|
| com.baidu.app1.Foo.doSomething( ) | <data distribution> |
| com.baidu.app1.Bar.doSomething( ) | <data distribution> |
| com.baidu.app1.Cool.doSomething( ) | <data distribution> |
| . . . | |

The performance data distributions of several interfaces are recorded in Table 1. In addition, Table 1 may further include an application name, and may record a start merging moment of the data distribution of each interface, a merging period of the data distribution of each interface, etc.

When a new performance data is collected, a row corresponding to the interface is found in the table above first, according to the interface identification. Next, the new performance data (such as a response time of a current call) may be merged into the data distribution corresponding to the interface identification.

According to the embodiments of the present disclosure, if the interface identification of the interface is not included in the merged item storage data structure, then a new merged item for the interface identification of the interface is created in the merged item storage data structure, so as to update the performance data distribution characteristic of the interface in the merged item storage data structure based on the new merged item.

FIG. 6 schematically shows a flowchart of updating the performance data distribution characteristic in the merged item storage data structure according to the embodiments of the present disclosure.

As shown in FIG. 6, the method includes operations S610 to S660.

In operation S610, the performance data having the interface identification is acquired.

In operation S620, the merged item storage data structure is traversed according to the interface identification, so as to search the row corresponding to the interface identification (also called merged item).

In operation S630, it is determined whether the merged item exists in the merged item storage data structure or not.

In operation S640, if the merged item does not exist in the merged item storage data structure, then the new merged item is created according to the new interface identification, and the data distribution of the merged item is null.

In operation S650, if the merged item exists in the merged item storage data structure, then the data distribution of the merged item is obtained.

In operation S660, the performance data acquired is merged with the data distribution of the merged item, so as to update the data distribution of the merged item.

According to the embodiments of the present disclosure, the distributed application may record each interface and the performance data distribution of each interface locally. Every time a preset monitor duration (such as the merging period in Table 1) is elapsed, all contents in the merged item storage data structure are transmitted to a data warehouse, and the merged item storage data structure is cleared locally.

According to the embodiments of the present disclosure, monitoring the interface performance of the distributed application, according to the updated performance data distribution characteristic of the interface may include following operations. If the preset monitor duration is elapsed, then the merged item storage data structure is transmitted to the data warehouse. The merged item storage data structure stored in the distributed application locally is removed.

According to the embodiments of the present disclosure, a stress is shared on the terminal by merging in the distributed application locally. Thus, a high-concurrency scenario may be carried, and local storage resources may be saved.

According to the embodiments of the present disclosure, the preset monitor duration may be set as needed. For example, the preset monitor duration may be 10 minutes, 1 hour, 2 hours, etc.

According to the embodiments of the present disclosure, when the merged item storage data structure is transmitted to the data warehouse, data in the merged item storage data structure may further be serialized.

FIG. 7 schematically shows a flowchart of transmitting the merged item storage data structure to the data warehouse according to the embodiments of the present disclosure.

As shown in FIG. 7, the method includes operations S710 to S750.

In operation S710, the preset monitor duration is elapsed.

In operation S720, data in a row of the merged item storage data structure is acquired.

In operation S730, the data in the row is serialized into a transmissible format.

In operation S740, it is determined whether the row is the last row in the merged item storage data structure or not.

In operation S750, if the row is the last row in the merged item storage data structure, all data is packaged and transmitted to the data warehouse. If the row is not the last row in the merged item storage data structure, operation S720 is re-performed.

According to the embodiments of the present disclosure, in operation S730, the data may be processed using a little endian. If the data warehouse is realized by C/C++, the little endian may be used for the serialization. In the little endian of an x86 architecture, the serialized data may keep a consistent format, providing convenience for C/C++ parsing. If the data warehouse is realized by Java or other big endian data warehouse, then the little endian may not be adopted.

According to the embodiments of the present disclosure, the performance data distribution characteristic may be the distribution characteristic of the interface response time. Since the response time data of the interface generally has strong bias, there may be a large number of zeros in the merged item storage data structure. In this case, a compression may compress a data volume, reducing network transmissions and storage resource occupation. Specific compression algorithm may include GZIP, BZIP2, etc.

According to the embodiments of the present disclosure, the data itself in the merged item storage data structure may be in a binary format. The data may be encoded into a text format using algorithms such as BASE64, making it convenient for transmitting, storing and debugging.

According to the embodiments of the present disclosure, the distributed application includes a plurality of interfaces. Monitoring the interface performance of the distributed application, according to the updated performance data distribution characteristic of the interface includes following operations. If the preset monitor duration is elapsed, current performance data distribution characteristics of each of the plurality of interfaces are transmitted to the data warehouse. All performance data distribution characteristics stored in the distributed application locally are removed.

According to the embodiments of the present disclosure, the stress is shared on the terminal by merging in the distributed application locally. Thus, a high-concurrency scenario may be carried. At the same time, a multi-level merging method may control the data amount effectively and carry massive data of the large-scale distributed system.

According to the embodiments of the present disclosure, the response time is taken as an example of the performance data. After the intercepted response times are merged into the data distributions, the local data distributions are uploaded to the data warehouse every time a merging interval (i.e., the preset monitor duration) is elapsed. Then the local data distributions are cleared.

According to the embodiments of the present disclosure, monitoring in the application level may be realized, which is not limited to a single application instance. Thus, a performance fluctuation of the distributed application may be perceived intuitively.

According to the embodiments of the present disclosure, at the data warehouse terminal, the data distributions uploaded by each application instance may be merged secondarily according to the interface identifications. A global data distribution may be merged for each interface, so as to calculate a global tantile for the interface.

According to the embodiments of the present disclosure, the data warehouse stores performance data distribution characteristic tables of all interfaces in the distributed system. For example, a structure of the performance data distribution characteristic table may be shown in Table 2.

According to the embodiments of the present disclosure, the data warehouse stores performance data distribution characteristics transmitted by one or more distributed applications in the distributed system. Performance data distribution characteristics for the same interface transmitted by each distributed application in the distributed system merged, so as to obtain a merged performance data distribution characteristic for the same interface.

According to the embodiments of the present disclosure, a monitor carrying capacity of the large-scale distributed system is designed through the multi-level merging and the data compression, and high performance may be realized.

TABLE 2

| Name | Type | Meaning | Example |
|---|---|---|---|
| app | String | An application of the data distribution | app1 |
| method | String | A method of the data distribution | com.baidu.app1.Foo.doSomething( ) |
| quantile_data | Data distribution object | A data distribution content | H4sIAAAAAAAAAF2TX0hTU |
| log_date | Date | A recording moment | 2020-10-14 18:00:00 |

In the process of realizing the present disclosure, it is found that there are limitations to monitor the tantile of the interface using relevant technologies, failing to monitor a distributed application in a cluster deployment. Moreover, there are relatively high requirements for computing resources when monitoring. Therefore, it is difficult to adapt to a balance of performance and profits in the monitoring of the large-scale system.

Due to the difficulty in the implementation of the tantile, it is difficult to find a tantile monitoring system, tantile monitoring function or tantile monitoring service to meet the requirements of monitoring the distributed application. The tantile has a high sensitivity to the interface performance, and tantile data is worthy in a performance analysis. Therefore, a tantile monitoring technology needs to be developed to meet the requirements of the distributed system.

According to the embodiments of the present disclosure, after obtaining the performance data distribution characteristic of the interface, the tantile for each of the plurality of interfaces in the distributed system may be determined according to the merged performance data distribution characteristic for the same interface.

According to the embodiments of the present disclosure, compared with an average value and other indexes, a tantile index is more sensitive to a fluctuation of the response time, and the tantile index tends to sense an existence of a system instability.

FIG. 8 schematically shows a flowchart of merging response time data distribution characteristics for the same interface transmitted by each distributed application and determining a tantile according to the embodiments of the present disclosure.

As shown in FIG. 8, the method includes operations S810 to S850.

In operation S810, for an interface a, the p-th response time tantile in a period of time t1 to t2 is calculated.

In operation S820, the data warehouse are filtered to obtain response time data distribution characteristics uploaded from each application instance.

In operation S830, all response time data distribution characteristics obtained by filtering are merged secondarily into a data distribution by a merging algorithm.

In operation S840, a tantile P is estimated by an algorithm using the data distribution after the secondary merging.

In operation S850, the tantile P of the interface a is obtained.

According to the embodiments of the present disclosure, the method of monitoring the interface performance provided by the embodiments of the present disclosure may be applied to monitor the interface performance in the application level.

According to the embodiments of the present disclosure, determining the tantile for each of the plurality of interfaces in the distributed system, according to the merged performance data distribution characteristic for the same interface includes following operations. A target value of a target interface input in a query by a user is acquired. A tantile corresponding to the target value is determined, according to the merged performance data distribution characteristic for the same interface.

According to the embodiments of the present disclosure, query of any tantile may be supported (that is, the target value of the target interface input by the user in the query is supported). Tantile calculating technologies may only query a fixed tantile calculated in advance. Compared with this, the embodiments of the present disclosure supports an online query of any tantile, and it is convenient to compare optimization effects of different tantiles. Without additional cost, the user is allowed to query any tantile, and effects and profits of different tantiles are compared when monitoring the performance. An error of the monitoring data may achieve about 0.1%, ensuring a reliability of the monitoring data.

According to the embodiments of the present disclosure, the tantile may be calculated without introducing an additional computing cluster, saving computing resources, relatively easy to be implemented, and reducing development and maintenance costs. According to the embodiments of the present disclosure, any tantile may be queried according to the tantile specified by the user in the query.

According to the embodiments of the present disclosure, in order to calculate the tantile of the interface, a GROUP BY operation may be performed using the application name app and the method (i.e. interface) of the data distribution as a key to merge the performance data distribution characteristics of the same group.

In order to implement a user-defined GROUP BY function, a distributed data warehouse supporting UDAF (user defined aggregate function) should be selected so that a secondary merging algorithm may be implemented in the data warehouse and take full advantage of the computing resources of the data warehouse. For example, Apache Doris supports UDAF functions written in C++ and Hive supports UDAF functions written in Java.

According to the embodiments of the present disclosure, the data warehouse may include a front end node, query nodes and a main query node.

The front end node is used to manage cluster metadata, receive a query, analyze the query, and plan the query.

The query node is used to store specific data and implement a specific query.

The main query node is used to summarize query results from each query node in a query process, and return a final result.

FIG. 9 schematically shows a flowchart of querying the tantile based on the data warehouse according to the embodiments of the present disclosure.

According to the embodiments of the present disclosure, the UDAF function is directly written to calculate the response time tantile of a certain interface of an application, according to the structure of the data warehouse above and a specific interface of the data warehouse. The UDAF function usually works in a GROUP BY clause of SQL or other merging scenarios. Some common UDAF functions include SUMO, COUNT( ) etc. The UDAF function implemented by the algorithm in the embodiments of the present disclosure takes the interface of the application as the key to group, analyzes and merges all time-consuming histogram data in the group to estimate the tantile.

As shown in FIG. 9, the method includes operations S910 to S940.

In operation S910, the tantile for the interface is queried.

In operation S920, performance data distribution characteristics are grouped according to applications and interfaces.

In operation S930, the tantile is estimated using the UDAF function in the group based on the query node, the main query node, etc.

In operation S940, the tantile for the interface is obtained.

According to the embodiments of the present disclosure, the histogram is taken as an example of the performance data distribution characteristic. To estimate the tantile through the histogram using the UDSF function, it generally needs: init, update, serialize, merge, and finalize. Specific processes are as follows.

The "init" runs on each query node of the distributed data warehouse for an initialization. The "init" is used to initialize a data structure of a merging target on the query node locally. In the initialization, a null histogram is created on each query node.

The "update" is used to sequentially traverse each row in the query node locally, and merge data of the row into the target. In the algorithm of the embodiments of the present disclosure, the histogram data is decoded by BASE64 first. Next, a GZIP decompression is performed to obtain a histogram object. Then, a merging operation for the histogram is used to merge the histogram object into the target histogram.

The "serialize" is used after the local merging of each query node has completed. In this case, a merging result of each query node may be transmitted to the main query node for a result merging. Therefore, the serialization should be implemented by each query node, so that the binary histogram data is transmitted to the main query node accurately and may be parsed accurately. In practice, the algorithm adopts a histogram data structure without pointers, so that the data may be transmitted directly. If a UDAF function implemented in Java or a C/C++ data structure having pointers is used, then a serialization format should be designed manually.

After the main query node receives the merging results transmitted by each query node, the "merge" is used to further merge the merging results into one result. In the algorithm of the embodiments of the present disclosure, each query node transmits a local-merged histogram, and the main node merges all the histograms into one histogram in the merging operation.

The "finalize" is used to obtain a final result using a final merging result by the main query node.

The global tantile of the interface is estimated by using the histogram obtained after the "merge".

FIG. 10 schematically shows a flowchart of querying the tantile by using the UDAF function according to the embodiments of the present disclosure.

As shown in FIG. 10, the method includes operations S1001 to S1010.

In operation S1001, the "init" is used to acquire a query tantile P specified by the user.

In operation S1002, a null histogram object is created as the merging target.

In operation S1003, all data in a row meeting a requirement are selected according to a query time range.

In operation S1004, data in a subsequent row is obtained.

In operation S1005, the "update" is used to parse data in a current row into a histogram object and merge the histogram object into the merging target.

In operation S1006, it is determined whether the current row is the last row or not. If the current row is the last row, then operation S1007 is performed. If the current row is not the last row, operation S1004 is re-performed.

In operation S1007, the merging results on the query nodes are obtained.

In operation S1008, the "serialize" is used to serialize the merging results into the binary format and transmit the serialized merging results to the main query node.

In operation S1009, the "merge" is used to generate a histogram by the main query node, according to the merging results uploaded by all the query nodes.

In operation S1010, the "finalize" is used to perform an estimation on the histogram and calculate the tantile p according to the query tantile P specified.

The response time tantile for each interface is finally obtained using the process of the UDAF function above. Different tantiles may be specified for each query. Thus, any tantile may be queried every time. It should be noted that obtaining the response time tantile is only an illustrative embodiment. Other types of tantiles (such as a data amount tantile, a concurrency tantile, a SQL execution number tantile, a cache hit number tantile, a downstream service call number tantile, and a log print number tantile) other than the response time tantile may further be obtained using the method of the embodiments of the present disclosure.

FIG. 11 schematically shows a flowchart of a method of monitoring an interface performance of a distributed application according to the embodiments of the present disclosure.

As shown in FIG. 11, when the caller requests for calling the interface of the application instance, the interface call is intercepted to obtain the performance data of the interface, such as the response interval of the interface, a response data amount of the interface, the cache hit number of the interface, etc. The intercepted performance data is merged into the original performance data distribution characteristic.

According to the embodiments of the present disclosure, every time the merging interval is elapsed, all application instances may upload the local performance data distribution characteristics to the data warehouse, and clear the local performance data distribution characteristics.

According to the embodiments of the present disclosure, the secondary merging may be performed at the data warehouse terminal. A function that may identify the data structure of the performance data distribution characteristic may be written manually, to perform the secondary merging. The merged performance data distribution characteristic for the same interface may be obtained.

According to the embodiments of the present disclosure, the interface call is intercepted from a service application, and the response interval of each interface call is counted.

Next, the data distribution is merged locally in the service application instance, thereby compressing the data amount. Then, each application instance uploads the local-merged data to the data warehouse to perform the secondary merging at the data warehouse terminal to obtain the merged performance data distribution characteristic for the same interface.

FIG. 12 schematically shows a block diagram of an apparatus of monitoring an interface performance of a distributed application according to the embodiments of the present disclosure.

As shown in FIG. 12, the apparatus 1200 of monitoring an interface performance of a distributed application includes an obtaining module 1210, an updating module 1220, and a monitoring module 1230.

The obtaining module 1210 is used to obtain a performance data of the interface for responding the caller request in case of detecting a caller request for calling an interface of the distributed application.

The updating module 1220 is used to update a performance data distribution characteristic of the interface according to the performance data of the interface for responding the caller request, so as to obtain an updated performance data distribution characteristic.

The monitoring module 1230 is used to monitor the interface performance of the distributed application, according to the updated performance data distribution characteristic of the interface.

According to the embodiments of the present disclosure, it is possible to monitor an interface performance of a large-scale distributed application, especially to monitor the tantile of the interface response times, and statistical information may be accurate to each interface. The embodiments of the present disclosure may solve a monitoring complexity caused by characteristics of the distributed system itself, and effectively monitor the interface performance of the distributed system. This is suitable for an online system, and is not limited to a testing phase.

According to the embodiments of the present disclosure, the updating module includes a first determining unit and an updating unit.

The first determining unit is used to determine a performance data distribution characteristic corresponding to an interface identification of the interface from a merged item storage data structure, according to the interface identification of the interface. The merged item storage data structure contains a plurality of interface identifications and a performance data distribution characteristic corresponding to each of the plurality of interface identifications.

The updating unit is used to update the performance data distribution characteristic of the interface in the merged item storage data structure, according to the performance data of the interface for responding the caller request.

According to the embodiments of the present disclosure, monitored data of all instances in a cluster may be converged into the application level for observation, by using the merged item storage data structure. Thus, a discreteness of a bottom layer in the distributed system may be shielded, and interface performance indexes of the distributed application may be monitored visually and globally.

According to the embodiments of the present disclosure, the updating module further includes a creating unit. The creating unit is used to create, if the merged item storage data structure does not include the interface identification of the interface, a new merged item for the interface identification of the interface in the merged item storage data structure, so as to update the performance data distribution characteristic of the interface in the merged item storage data structure based on the new merged item.

According to the embodiments of the present disclosure, the monitoring module includes a first transmitting unit and a first removing unit.

The first transmitting unit is used to transmit the merged item storage data structure to a data warehouse if a preset monitor duration is elapsed.

The first removing unit is used to remove the merged item storage data structure stored in the distributed application locally.

According to the embodiments of the present disclosure, the distributed application may include a plurality of interfaces, and the monitoring module includes a second transmitting unit and a second removing unit.

The second transmitting unit is used to transmit current performance data distribution characteristics of each of the plurality of interfaces to a data warehouse if a preset monitor duration is elapsed.

The second removing unit is used to remove all performance data distribution characteristics stored in the distributed application locally.

According to the embodiments of the present disclosure, the data warehouse stores performance data distribution characteristics transmitted by one or more distributed applications in a distributed system. The apparatus 1200 of monitoring an interface performance of a distributed application further includes a merging module and a determining module.

The merging module is used to merge performance data distribution characteristics for the same interface transmitted by each distributed application in the distributed system, so as to obtain a merged performance data distribution characteristic for the same interface.

The determining module is used to determine a tantile for said each of the plurality of interfaces in the distributed system, according to the merged performance data distribution characteristic for the same interface.

According to the embodiments of the present disclosure, the determining module includes an acquiring unit and a second determining unit.

The acquiring unit is used to acquire a target value of a target interface input in a query by a user.

The second determining unit is used to determine a tantile corresponding to the target value, according to the merged performance data distribution characteristic for the same interface.

According to the embodiments of the present disclosure, the obtaining module includes a first recording unit, a second recording unit and a third determining unit.

The first recording unit is used to record a start calling moment of the interface in case of detecting the caller request for calling the interface of the distributed application.

The second recording unit is used to record an end calling moment of the interface.

The third determining unit is used to determine the performance data of the interface for responding the caller request according to the start calling moment and the end calling moment.

According to the embodiments of the present disclosure, the present disclosure further provides an electronic device, a readable storage medium and a computer program product.

According to the embodiments of the present disclosure, the electronic device includes at least one processor; and a memory communicatively connected to the at least one processor. The memory stores instructions executable by the at least one processor. When the instructions being executed by the at least one processor, causing the at least one processor to implement the method of monitoring an interface performance of a distributed application as described above.

According to the embodiments of the present disclosure, there is provided a non-transitory computer-readable storage medium having computer instructions stored thereon. The computer instructions allow a computer to implement the method of monitoring an interface performance of a distributed application as described above.

According to the embodiments of the present disclosure, the computer program product includes computer programs, and the computer programs, when executed by a processor, implement the method of monitoring an interface performance of a distributed application as described above.

According to the embodiments of the present disclosure, it is possible to monitor the interface performance of a large-scale distributed application, especially to monitor the tantile of the interface response times, and statistical information may be accurate to each interface. The embodiments of the present disclosure may solve a monitoring complexity caused by characteristics of the distributed system itself, and effectively monitor the interface performance of the distributed system. This is suitable for an online system, and is not limited to a testing phase.

FIG. 13 schematically shows a block diagram of an exemplary electronic device 1300 that may be used to implement the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 13, the device 1300 includes a computing unit 1301, which may execute various appropriate actions and processing according to computer programs stored in a read only memory (ROM) 1302 or computer programs loaded into a random access memory (RAM) 1303 from a storage unit 1308. Various programs and data required for operations of the device 1300 may further be stored in the RAM 1303. The computing unit 1301, the ROM 1302 and the RAM 1303 are connected to each other through a bus 1304. An input/output (I/O) interface 1305 is further connected to the bus 1304.

A plurality of components in the device 1300 are connected to the I/O interface 1305, including: an input unit 1306, such as a keyboard, a mouse, etc.; an output unit 1307, such as various types of displays, speakers, etc.; the storage unit 1308, such as a magnetic disk, an optical disk, etc.; and a communication unit 1309, such as a network card, a modem, a wireless communication transceiver, etc. The communication unit 1309 allows the device 1300 to exchange information/data with other devices through a computer network such as the Internet and/or various telecommunication networks.

The computing unit 1301 may be various general-purpose and/or special-purpose processing assemblies having processing and computing capabilities. Examples of the computing unit 1301 include but are not limited to a central processing unit (CPU), a graphics processing unit (GPU), various special-purpose artificial intelligence (AI) computing chips, various computing units running machine learning model algorithms, digital signal processing (DSP), and any appropriate processor, controller, microcontroller, etc. The computing unit 1301 implements the various methods and processes described above, for example, the method of monitoring an interface performance of a distributed application. For example, in some embodiments, the method of monitoring an interface performance of a distributed application may be implemented as computer software programs, which is tangibly contained in a machine-readable medium, such as the storage unit 1308. In some embodiments, part of the computer programs or all of the computer programs may be loaded and/or installed on the device 1300 via the ROM 1302 and/or the communication unit 1309. When the computer programs are loaded into the RAM 1303 and executed by the computing unit 1301, one or more operations of the method of monitoring an interface performance of a distributed application described above may be executed. Optionally, in other embodiments, the computing unit 1301 may be configured to implement the method of monitoring an interface performance of a distributed application in any other suitable manner (for example, by means of firmware).

Various implementations of the systems and technologies described above may be implemented in digital electronic circuit systems, integrated circuit systems, field programmable gate arrays (FPGA), application specific integrated circuits (ASIC), application-specific standard products (ASSP), systems on a chip (SOC), complex programmable logic devices (CPLD), computer hardware, firmware, software, and/or a combination thereof. These various embodiments may include: the systems and technologies being implemented in one or more computer programs. The one or more computer programs may be executed and/or interpreted on a programmable system including at least one programmable processor. The programmable processor may be a special-purpose programmable processor or a general-purpose programmable processor that may receive data and instructions from a storage system, at least one input device, and at least one output device, and may transmit data and instructions to a storage system, at least one input device, and at least one output device.

Program codes for implementing the method of the present disclosure may be written in any combination of one or more programming languages. These program codes may be provided to processors or controllers of general-purpose computers, special-purpose computers, or other programmable data processing devices, so that the program codes, when executed by the processors or controllers, implement the functions/operations specified in the flowcharts and/or block diagrams. The program codes may be executed on a machine entirely, executed on a machine partly, executed on a machine partly as an independent software package and executed on a remote machine partly, or executed on a remote machine or server entirely.

In the context of the present disclosure, the machine-readable medium may be a tangible medium, which may contain or store programs used by an instruction execution system, an instruction execution apparatus, or an instruction execution device or used in combination with the instruction execution system, the instruction execution apparatus, or the instruction execution device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage media may include electrical connections based on one or more wires, portable computer disks, hard disks, random access memories (RAM), read only memories (ROM), erasable programmable read only memories (EPROM or flash memory), optical fibers, portable compact disk read only memory (CD-ROM), optical storage device, magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the systems and technologies described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

We claim:

1. A computer-implemented method of monitoring an interface performance of a distributed application, comprising:
    obtaining a performance data of an interface of the distributed application for responding a caller request by intercepting the interface, in response to the caller request for calling the interface being detected;
    updating a performance data distribution characteristic of the interface according to the performance data of the interface for responding the caller request, so as to obtain an updated performance data distribution characteristic; and
    monitoring the interface performance of the distributed application, according to the updated performance data distribution characteristic of the interface, wherein
    the updating the performance data distribution characteristic of the interface according to the performance data of the interface for responding the caller request includes:
        determining a performance data distribution characteristic corresponding to an interface identification of the interface from a merged item storage data structure, according to the interface identification of the interface, wherein the merged item storage data structure contains a plurality of interface identifications and a performance data distribution characteristic corresponding to each of the plurality of interface identifications; and
        updating the performance data distribution characteristic of the interface in the merged item storage data structure, according to the performance data of the interface for responding the caller request,
    the monitoring the interface performance of the distributed application, according to the updated performance data distribution characteristic of the interface, includes:
        transmitting the merged item storage data structure to a data warehouse, in response to a preset monitor duration being elapsed, wherein the data warehouse stores performance data distribution characteristics transmitted by one or more distributed applications in a distributed system; and
        removing the merged item storage data structure stored in the distributed application locally, and
    after transmitting the merged item storage data structure to the data warehouse, merging, on the data warehouse, performance data distribution characteristics for the same interface transmitted by each distributed application in the distributed system, so as to obtain a merged performance data distribution characteristic for the same interface, and determining a tantile for the interface in the distributed system according to the merged performance data distribution characteristic for the same interface.

2. The method of claim 1, wherein the updating a performance data distribution characteristic of the interface according to the performance data of the interface for responding the caller request further comprises:
    creating a new merged item for the interface identification of the interface in the merged item storage data structure, in response to the merged item storage data structure not including the interface identification of the interface, so as to update the performance data distribution characteristic of the interface in the merged item storage data structure based on the new merged item.

3. The method of claim 1, wherein the distributed application comprises a plurality of interfaces, and wherein the monitoring the interface performance of the distributed application, according to the updated performance data distribution characteristic of the interface comprises:

transmitting current performance data distribution characteristics of each of the plurality of interfaces to a data warehouse, in response to a preset monitor duration being elapsed; and removing all performance data distribution characteristics stored in the distributed application locally.

4. The method of claim 1, wherein the determining a tantile for said each of the plurality of interfaces in the distributed system, according to the merged performance data distribution characteristic for the same interface comprises:

acquiring a target value of a target interface input in a query by a user; and determining a tantile corresponding to the target value, according to the merged performance data distribution characteristic for the same interface.

5. The method of claim 1, wherein the obtaining a performance data of an interface of the distributed application for responding a caller request by intercepting the interface, in response to the caller request for calling the interface being detected, comprises:

recording a start calling moment of the interface;
recording an end calling moment of the interface; and
determining the performance data of the interface for responding the caller request according to the start calling moment and the end calling moment.

6. An electronic device, comprising:

at least one processor; and a memory communicatively connected to the at least one processor, wherein the memory stores instructions executable by the at least one processor, and the instructions, when executed by the at least one processor, cause the at least one processor to implement operations of monitoring an interface performance of a distributed application, comprising:

obtaining a performance data of an interface of the distributed application for responding a caller request by intercepting the interface, in response to the caller request for calling the interface being detected;

updating a performance data distribution characteristic of the interface according to the performance data of the interface for responding the caller request, so as to obtain an updated performance data distribution characteristic; and monitoring the interface performance of the distributed application, according to the updated performance data distribution characteristic of the interface, wherein the updating the performance data distribution characteristic of the interface according to the performance data of the interface for responding the caller request incudes:

determining a performance data distribution characteristic corresponding to an interface identification of the interface from a merged item storage data structure, according to the interface identification of the interface, wherein the merged item storage data structure contains a plurality of interface identifications and a performance data distribution characteristic corresponding to each of the plurality of interface identifications; and updating the performance data distribution characteristic of the interface in the merged item storage data structure, according to the performance data of the interface for responding the caller request, the monitoring the interface performance of the distributed application, according to the updated performance data distribution characteristic of the interface includes:

transmitting the merged item storage data structure to a data warehouse, in response to a preset monitor duration being elapsed, wherein the data warehouse stores performance data distribution characteristics transmitted by one or more distributed applications in a distributed system; and removing the merged item storage data structure stored in the distributed application locally, and after transmitting the merged item storage data structure to the data warehouse, merging, on the data warehouse, performance data distribution characteristics for the same interface transmitted by each distributed application in the distributed system, so as to obtain a merged performance data distribution characteristic for the same interface, and determining a tantile for the interface in the distributed system according to the merged performance data distribution characteristic for the same interface.

7. A non-transitory computer-readable storage medium having computer instructions stored thereon, wherein the computer instructions allow a computer to implement operations of monitoring an interface performance of a distributed application, comprising:

obtaining a performance data of an interface of the distributed application for responding a caller request by intercepting the interface, in response to the caller request for calling the interface being detected;

updating a performance data distribution characteristic of the interface according to the performance data of the interface for responding the caller request, so as to obtain an updated performance data distribution characteristic; and monitoring the interface performance of the distributed application, according to the updated performance data distribution characteristic of the interface, wherein the updating the performance data distribution characteristic of the interface according to the performance data of the interface for responding the caller request includes:

determining a performance data distribution characteristic corresponding to an interface identification of the interface from a merged item storage data structure, according to the interface identification of the interface, wherein the merged item storage data structure contains a plurality of interface identifications and a performance data distribution characteristic corresponding to each of the plurality of interface identifications; and updating the performance data distribution characteristic of the interface in the merged item storage data structure, according to the performance data of the interface for responding the caller request, the monitoring the interface performance of the distributed application, according to the updated performance data distribution characteristic of the interface includes:

transmitting the merged item storage data structure to a data warehouse, in response to a preset monitor duration being elapsed, wherein the data warehouse stores performance data distribution characteristics transmitted by one or more distributed applications in a distributed system; and removing the merged item storage data structure stored in the distributed application locally, and after transmitting the merged item storage data structure to the data warehouse, merging, on the data warehouse, performance data distribution characteristics for the same interface transmitted by each distributed application in the distributed system, so as to obtain a merged performance data distribution characteristic for the same interface, and determining a tantile for the interface in the distributed system according to the merged performance data distribution characteristic for the same interface.

\* \* \* \* \*